Oct. 29, 1968　　　R. J. SLEZAK　　　3,407,673
BELT TRACKING APPARATUS
Filed May 19, 1966　　　　　　　　　　　　　　5 Sheets-Sheet 1
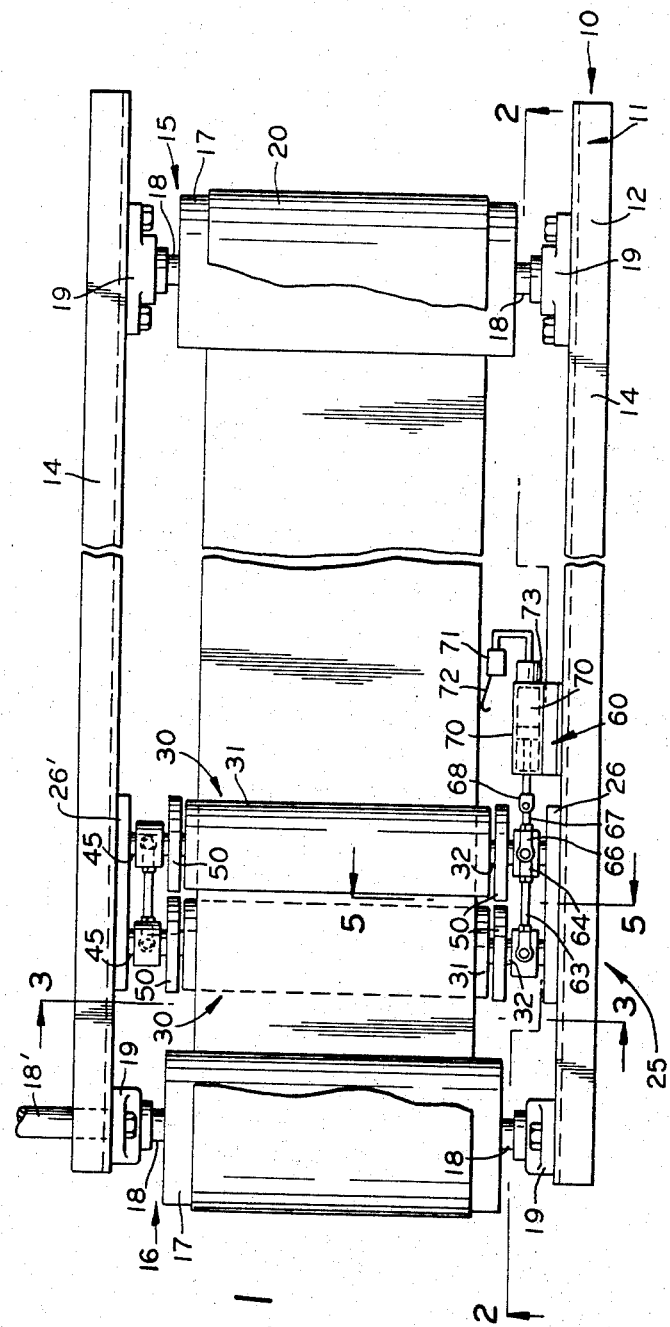
INVENTOR.
RAYMOND J. SLEZAK
BY Hamilton & Cook
ATTORNEYS

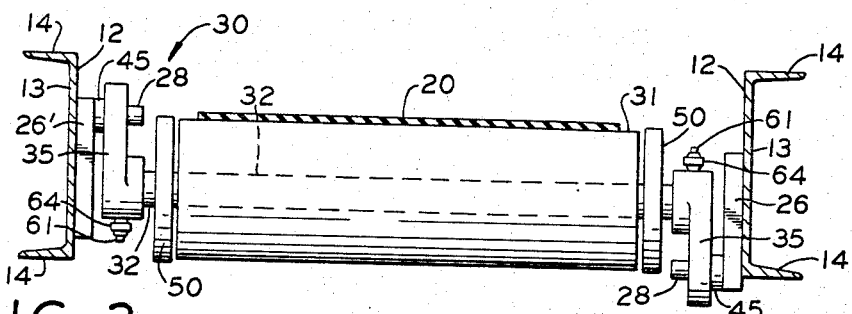
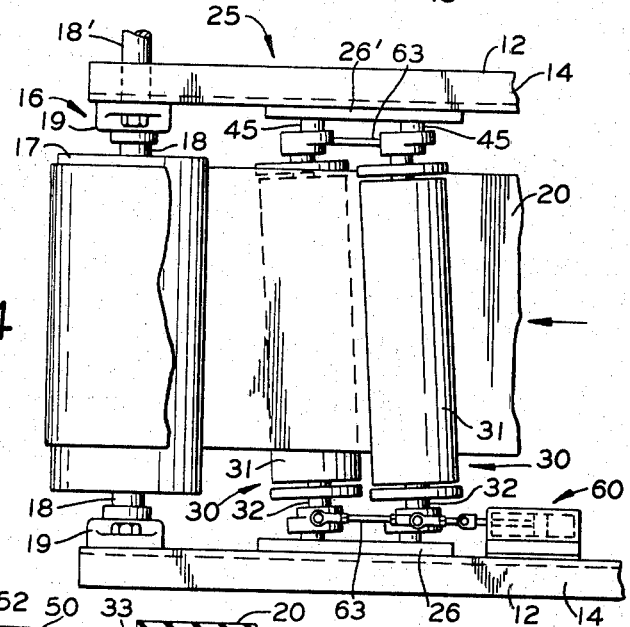
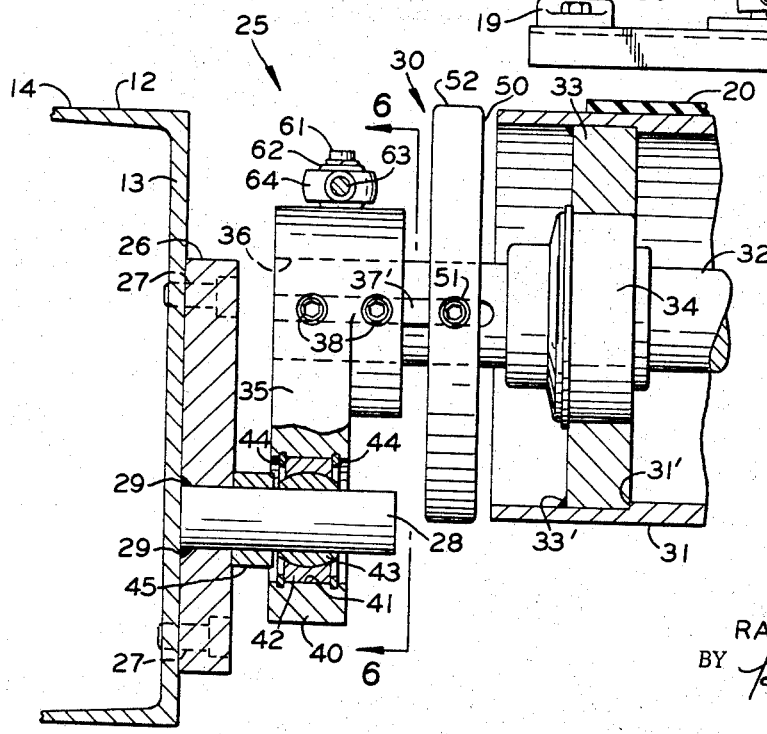

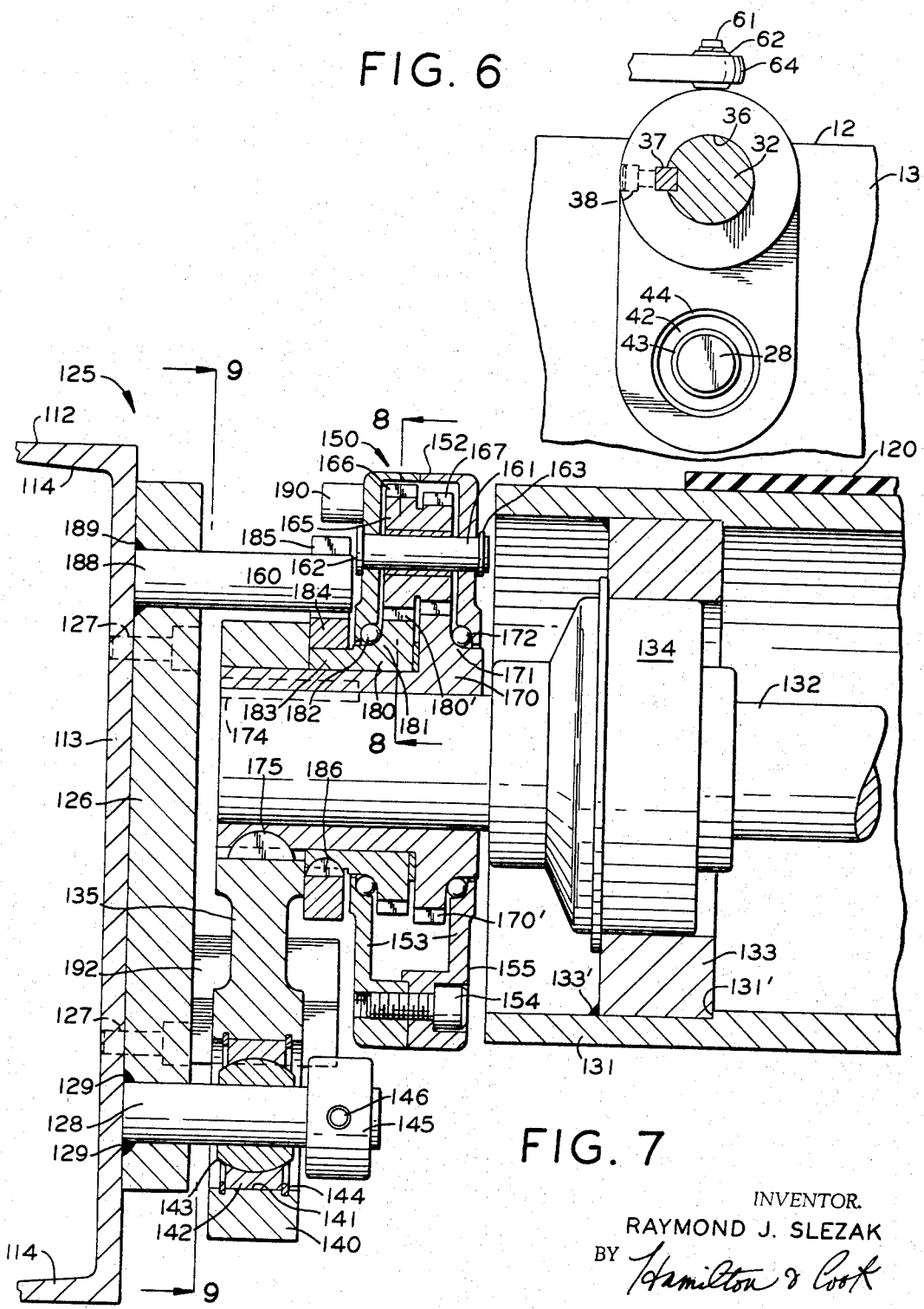

Oct. 29, 1968    R. J. SLEZAK    3,407,673
BELT TRACKING APPARATUS
Filed May 19, 1966    5 Sheets-Sheet 5

INVENTOR.
RAYMOND J. SLEZAK
BY Hamilton & Cook
ATTORNEYS

United States Patent Office 3,407,673
Patented Oct. 29, 1968

3,407,673
BELT TRACKING APPARATUS
Raymond J. Slezak, 558 Princeton Ave.,
Barberton, Ohio 44203
Filed May 19, 1966, Ser. No. 551,294
14 Claims. (Cl. 74—241)

ABSTRACT OF THE DISCLOSURE

A belt tracking apparatus composed of a tracking roller assembly having a frame, a shaft with a roller freely rotatably mounted thereon to engage a moving belt, a pair of suspension pins attached to the frame, and a pivot arm rotatably mounted on each suspension pin and supporting the shaft, with at least one pivot arm non-rotatably attached to the shaft, whereby any mistracking of a moving belt to one side of the roller causes an angular displacement of the pivot arm and roller to correct the lateral travel of the belt.

---

This invention relates generally to apparatus for positioning a web, strip, belt, film, or other elongate material on a roller system. More particularly, the invention relates to apparatus for mounting and positioning one or more rollers to center a traveling web or belt member thereon. Specifically, the invention relates to apparatus for mounting one or more rollers of a system carrying a moving web or belt member, whereby any deviation of the web or belt from a centered position on the rollers is detected and the rollers are positioned to correct the direction of travel of the web member.

In recent years, the necessity for automation to remain competitive has prompted advances in the field of moving webs and belts which are employed as conveyor belts and as feed mechanisms for supplying strips of metal, paper, photographic film, and other materials. In most instances, these moving web or belt devices have been individually designed for a particular environment with little universal adaptability. The increased demand in areas such as assembly line conveyors commonly having short-centered, wide belts has propmpted an interest in roller mounting apparatus which can be used for different purposes and adapted to existing systems.

Over the years, many different types of apparatus have been designed for the purpose of centering webs, belts, and strips on moving rotating rolls. Early approaches to the problem included tightening the tension in the belt and improving the precision of roller alignment; however, these methods had the marked disadvantages of damaging the belts and extreme expense, respectively, without providing a total solution to the problem. More recently, efforts have been made to incorporate a self-centering feature into the design of the rollers by employing two-part conical or cylindrical rolls mounted on one or more shaft members and designing a roll surface having a plurality of non-radial disks or lugs formed by spaced slots or other means which apply a lateral or transverse corrective force to the webs. These systems have the disadvantages of requiring high precision manufacture and providing reduced efficiency or inoperativeness when subjected to uneven wear or minor damage.

To avoid the problems of these systems, many designs have used standard cylindrical rollers with suitable mounting assemblies which alter the position of the rollers to accomplish belt alignment. These suspension are constructed to displace the rollers in a plane parallel to the web, in a plane vertical to the belt, or a combination of these motions to apply a corrective force according to well known principles. Normally, a sensor, associated with the web to determine its position, provides a signal through suitable mechanical or eletcromechanical components to displace the roller for corrective tracking of the web. However, many of these systems employ extremely complex linkages which are subject to frequent breakdown and which are not readily adaptable to the framework of an existing conveyor system.

Accordingly, a principal object of the present invention is to provide web guiding apparatus which has an automatic tendency to center a misaligned belt member due to inherent drag on the roller causing a corrective shift of position.

Another object of the invention is to provide web guiding apparatus having roll mounting shafts carrying friction disks which intensify the drag produced by a misaligned belt or web.

A further object of the invention is to provide friction disks on the roll mounting shafts which house linkages providing a mechanical advantage to the drag or friction force tending to shift the position of the roller.

An additional object of the invention is to provide web guiding apparatus which may be employed with conventional sensors for determining the positions of the web and an externally energized power assist which drives the roller to a corrective position.

Still another object of the invention is to provide web guiding apparatus which is relatively compact and adapted for mounting on the framework of a wide variety of existing systems.

Still a further object of the invention is to provide apparatus which will not cause wear or otherwise adversely affect the expensive web, belt, or strip members and which in inexpensive to manufacture, easy to install, simple to service, and relatively durable and maintenance free.

Various other objects and advantages will appear from the following description taken in conjunction with the attached drawings, and the novel features will be particularly pointed out hereinafter in conjunction with the appended claims.

In the drawings:

FIG. 1 is a top plan view of a short-centered, wide belt conveyor system, with a portion of the belt broken away, having self-energized belt centering apparatus according to the present invention and an auxiliary power source actuated by external sensing and power drive equipment.

FIG. 2 is a section view taken substantially on line 2—2 of FIG. 1 of the belt conveyor system and the belt centering apparatus according to the invention.

FIG. 3 is a section view taken substantially on line 3—3 of FIG. 1 and showing the mounting of a roller of the belt centering apparatus.

FIG. 4 is a top plan view showing a fragmentary portion of FIG. 1 with the belt mistracking or off-center and the belt centering apparatus displaced to a corrective position.

FIG. 5 is an enlarged fragmentary section view taken substantially on line 5—5 of FIG. 1 and showing the end of one tracking roller assembly of the belt centering apparatus having a belt energized friction disk adjacent the roller.

FIG. 6 is a fragmentary section view taken substantially on line 6—6 of FIG. 5 and showing particularly the pivot arm portion of a tracking roller assembly.

FIG. 7 is an enlarged fragmentary section view, similar to FIG. 5, showing an embodiment of the invention wherein the friction disk of the roller tracking assembly houses a planetary gearing arrangement to develop a mechanical advantage for the belt energized friction disk drive.

Figure 8:
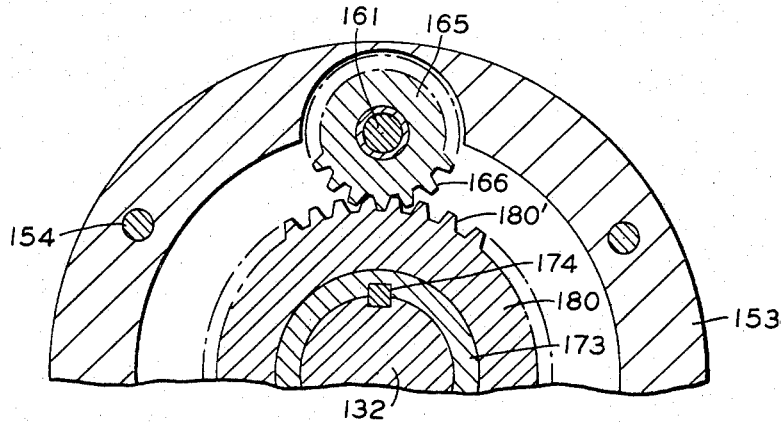
FIG. 8 is a fragmentary section view taken substantially on line 8—8 of FIG. 7 and showing the details of the planetary gearing in the friction disk.

Referring now to the drawings and particularly to FIGS. 1 and 2, a conveyor system, generally indicated by the numeral 10, is depicted as an exemplary environment for the present invention. The system shown is a somewhat short-centered, relatively wide belt conveyor to which the invention is particularly suited; however, the invention may be used advantageously in conjunction with all types of closed and non-closed belt supporting systems. The conveyor system 10 has a supporting frame, generally indicated by the numeral 11, having spaced beams 12 which support the operative components. Numerous conventional structural steel forms will provide suitable rigidity for precision operation, with the channel beams 12 having a web 13 and spaced flanges 14, top and bottom, being a typical example (FIG. 3). Suitable cross supports (not shown) for reinforcement, and legs or vertical supports (also, not shown) may be provided to position the support frame 11 in any desired location.

Suspended within the supporting frame 11 and preferably near the longitudinal ends thereof are end or terminal roller assemblies, generally indicated by the numerals 15 and 16, either of which may be the driving member and the other the driven or idler member. The roller assemblies 15 and 16 each have substantially cylindrical rolls 17 which are attached to shafts 18 journaled at either end in bearings 19. As shown, the shaft 18 of roller assembly 16 extends through one bearing 19 and the adjacent channel beam 12 to constitute a drive shaft 18' which may be rotationally powered by a suitable drive chain and electric motor (not shown).

The terminal rollers 15, 16 support a conveyor belt 20 which is preferably of slightly narrower width than the cylindrical rolls 17 for a purpose to be hereinafter detailed. Conveyor belt 20 is formed as a continuous loop and reeved about the rolls 17 in a well known manner. The belt 20 may be constructed of any of a number of metallic, elastomeric, or combination materials depending upon the service to which the conveyor system 10 is to be subjected.

Mounted within the supporting frame 11 and intermediate the terminal rollers 15, 16 is a belt tracking assembly, generally indicated by the numeral 25, which tends to maintain the conveyor belt 20 laterally centered on the rolls 17. Referring now to FIGS. 1–3, and 5, the tracking assembly 25 has mounting plates 26 and 26' at either lateral extremity which are attached to the webs 13 of channel beams 12 by appropriate fasteners, such as the machine bolts 27 (FIG. 5). The mounting plates 26 and 26' each have a pair of suspension pins 28 rigidly secured thereto, as by fillet welds 29 at the surfaces abutting the webs 13, and projecting outwardly toward the opposite channel beam 12 and preferably substantially perpendicular to the webs 13.

As shown, a pair of tracking roller assemblies, generally indicated by the numeral 30, constitute the moving or compensating elements of the tracking assembly 25. The tracking roller assemblies 30 may be identical and have cylindrical rolls 31 which may be similar to but may be of different and preferably smaller diameter than rolls 17 of terminal roller assemblies 15, 16 and which receive and seat the belt 20 on a portion of their peripheral surfaces. Since the tracking roller assemblies 30 are identical, only the assembly nearest the terminal roller 16 is shown in detail in FIGS. 3 and 5. Each roll 31 is freely rotatably mounted on a through shaft 32 extending a distance beyond each end thereof. Nonrotatably mounted within each end of rolls 31 are annular inserts 33 which may be fixed longitudinally of rolls 31 by shoulders 31' and rotationally secured by fillet welds 33'. The inserts 33 nonrotatably seat bearing races 34 to serve as collars for the shafts 32. Thus, the rolls 31 are free to smoothly rotate about the shafts 32 when frictionally engaged by the conveyor belt 20.

Axially outwardly of the ends of rolls 31, the shafts 32 are linked to opposed suspension pins 28 of mounting plates 26 and 26' by pivot arms 35. As best seen in FIGS. 5 and 6, the pivot arms 35 have a bore 36 which encases the shaft 32. The pivot arms 35 may be generally rectangular in overall configuration with rounded corners and are nonrotatably attached at one end to the shaft 32, as by suitable keys 37 (FIGS. 2 and 5). If desired, set screws 38 may be inserted into the pivot arms 35 to engage the keys 37 and prevent them from accidentally working out. The other end of each pivot arm 35 is freely rotatably mounted on one of the suspension pins 28. Preferably the pivot arms 35 form collars 40 having through bores 41 which receive appropriate bearing members. As shown, the bores 41 seat a bearing race 42 carrying spherical bearings 43 and secured in place by retaining rings 44. Suitable clearance is provided between the moving collar 40 of pivot arm 35 and the adjacent mounting block 26, 26' by means of annular spacers 45.

Referring now to FIGS. 2 and 3 particularly, it is an important feature of the present invention that the pivot arms 35 of each tracking roller assembly 30 are normally positioned substantially perpendicular with reference to the plane of the incoming portion of the belt, designated 20' in FIG. 2, and extended in opposite directions. As seen in referring to FIG. 3, the pivot arm 35 at the left end of shaft 32 extends above the shaft 32, while the pivot arm 35 at the right end is directed downwardly of the shaft 32.

The operation of the tracking roller assemblies 30 can be described with regard to the components identified above. The belt 20 is reeved about rolls 17, as shown in FIGS. 1 and 2, and positioned substantially symmetric of the length thereof. The tracking roller assemblies are at that time aligned so that the rolls 31 receive the belt 20 medially thereof and the pivot arms 35 extend substantially perpendicular with reference to the plane of the incoming portion of the belt 20'. During operation, the belt 20 will mistrack or deviate to one side of the rolls 17 and 31 due to minute errors in roll alignment, defects in a conveyor belt, or other minor discrepancies in the system. When such mistracking occurs, as depicted in FIG. 4, the belt 20 becames asymmetric about the center of the longitudinal length of the rolls 31 and sets up an increased drag or friction force due to internal stiffness on the side to which the belt has displaced and a reduced force on the other side. Due to the mounting of the tracking roller assemblies 30, the ends of the rolls 31 toward which the belt 20 has tracked swing or pivot about the suspension pins 28 in the direction of belt travel or movement; the other ends of rolls 31 swing in the opposite direction, or contra belt travel; therefore, a point on rolls 31 preferably substantially medially of the length remains substantially fixed in the plane of the incoming portion of belt travel 20'. If desired, stops (not shown) may be employed to restrict the amount of pivot, since small angular displacements provide adequate correction. The annular spacers 45 may be designed to allow for any slight axial displacement of the pivot arms 35 along suspension pin 28. With the tracking roller assemblies 30 so pivoted as depicted in FIG. 4, the belt 20 is carried and discharged in a direction normal to the rolls 31 giving it a motion component transversely of the direction of belt travel, thereby tending to return the belt 20 to the central symmetric position. As the belt 20 returns to the center position, the drag or friction force is reduced, the rolls 31 tend to swing back to the normal position, and the system stabilizes until a further misalignment occurs.

The belt tracking assembly 25 is therefore self-aligning or self correcting under normal operating conditions. Although a single tracking roller assembly 30, if properly placed to engage a sufficient portion of the belt 20, will carry out the objects of the invention, a pair of tracking roller assemblies positioned substantially as shown in FIGS. 1 and 2 is advantageous to ensure adequate frictional contact between the rolls 31 and the belt 20, while maintaining a compact system.

Although the above described self-energized system may be employed for most conveyors, it is necessary to provide auxiliary power to shift the tracking roller assemblies 30 in instances where the reaction time is unduly slow. These auxiliary power devices may be of the self-energized type, i.e., energized by the conveyor belt motion, or exteriorly energized by an independent power source. An example of a self-energized auxiliary power device according to the present invention is shown in FIGS. 1–5 as a friction disk 50 carried by the shaft 32 of tracking roller assembly 30. One friction disk 50 is located between and proximate to each end of rolls 31 and the pivot arm 35 spaced a short distance therefrom and is nonrotatably attached to the shaft 32 in a manner similar to pivot arm 35, as by an extension 37′ of key 37 and a set screw 51. The outer contact surface 52, preferably being circular or of other arcuate configuration, of friction disks 50 is preferably of a slightly larger radial dimension than the surface of roll 31, so that the conveyor belt 20 will be expanded to make firm frictional contact. The effectiveness of the friction disks 50 is due largely to the nonrotatable mounting which produces a strong, sudden drag on the lateral extremity of the belt 20 as distinguished from the rotatable mounting of rolls 31. If desired, friction disks 50 could be constructed as integral projections on the pivot arms 35 with equivalent performance.

For purposes of illustration, an exteriorly energized auxiliary power source is also shown in conjunction with the belt tracking assembly 25 of FIGS. 1–5 and is adapted for use as the only auxiliary power source or in combination with a self-energized auxiliary source, such as the friction disk 50. The auxiliary power system, as shown, is a fluid drive, generally indicated by the numeral 60. The pivot arms 35 are preferably adapted to receive cap screws 61 which carry ball members 62 in the area of the attachment of shaft 32 (FIGS. 5 and 6). A connecting rod 63 having longitudinally adjustable socket members 64 at either end rigidly joins the adjacent pivot arms 35. One cap screw 61 at one end of tracking roller assemblies 30 may be provided with a second ball member 65 engaged by a socket 66 of a drive rod 67 (FIG. 2). The drive rod 67 is connected through suitable linkage 68 to a pneumatic or hydraulic cylinder 70 of conventional design.

The hydraulic cylinder 70 is actuated by a sensor which may take the form of a switch 71 operated by an arm or feeler 72 which is positioned proximate to the conveyor belt 20 to detect lateral displacement or mistracking. The switch 71 operates a fluid motor 73 which is operatively linked to the hydraulic cylinder 70. When the switch 71 is operated by the feeler 72, a corrective signal is transmitted to the motor 73 which pumps fluid to the cylinder 70 to move the drive rod 67 and shift or pivot the pivot arms 35 in the manner previously described. This type of external power source may be designed to be sensitive to minute tracking errors and can develop any power requirements necessary to produce shifting of a tracking system; however, it is relatively complex, requires considerable maintenance, and is expensive.

Figure 9:
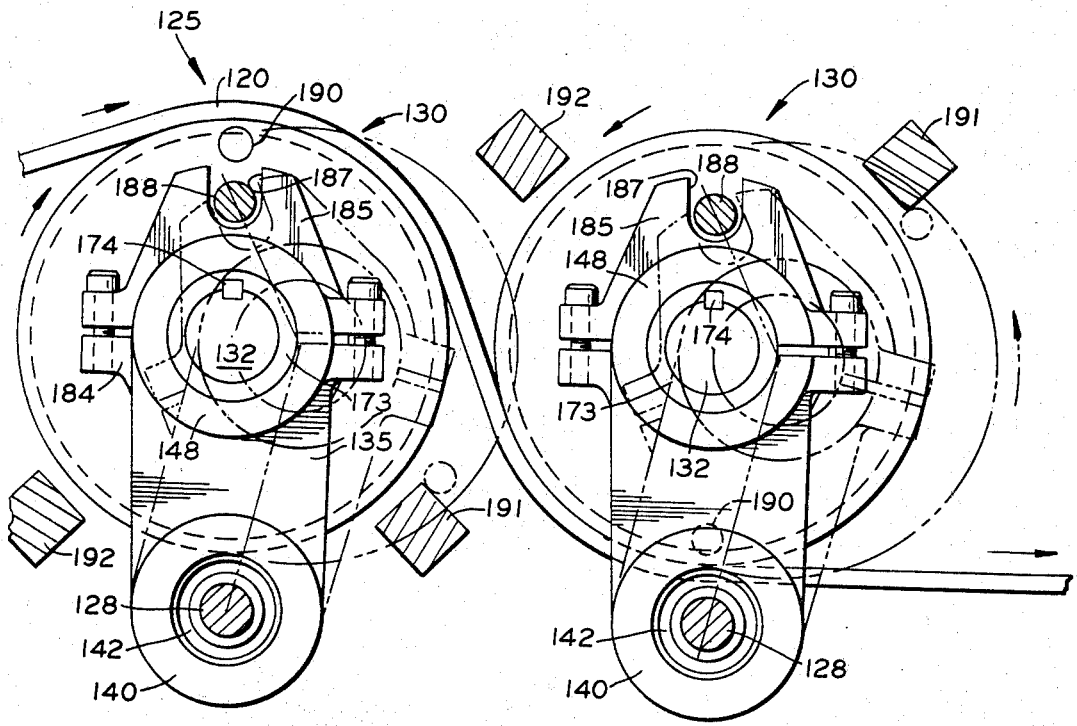
FIG. 9 is a section view taken substantially on line 9—9 of FIG. 7 and showing the ends of adjacent roller tracking assemblies with displacement to a corrective position shown in chain lines.

Although the above described auxiliary power devices provide great flexibility, it is frequently desirable to maintain a simple, self-energized system which will react rapidly in a high load environment. In cases where the above described self-energized friction disk 50 provides inadequate response, a modified form of tracking assembly, generally indicated by the numeral 125 and shown in FIGS. 7, 8 and 9, is advantageous to give an additional mechanical advantage.

The tracking assembly 125 may be employed and is shown in the same environment as tracking assembly 25. The portion of a channel beam 112 having web 113 and spaced flanges 114 may be identical to the beam 12 of the previously described frame 11. The other components of the frame, terminal rollers 15, 16 and conveyor belt 20 appearing in FIGS. 1–6 would also be present. Tracking assembly 125 may be attached to the frame in the same position and in a manner identical to the tracking assembly 25 described above. A mounting plate 126 is attached to the web 113 of channel beam 112 by fasteners 127. A suspension pin 128 is rigidly secured to mounting plate 126 by fillet welds 129 and projects outwardly therefrom and substantially perpendicular thereto.

As in the tracking assembly 25, a pair of tracking roller assemlies 130 may be employed (FIG. 9) which are similar to the assemblies 30, except for the particulars hereinafter noted. Each tracking roller assembly has a roll 131 which seats a conveyor belt 120 on a portion of its periphery. The roll 131 is freely rotatably mounted on a through shaft 132. Nonrotatably mounted within the end of roll 131 is an annular insert 133 which is fixed longitudinally of roll 131 by shoulder 131′ and rotationally secured by a fillet weld 133′. The insert 133 nonrotatably seats a bearing race 134 to serve as a collar for the shaft 132.

Axially outwardly of the ends of roll 131, the shaft 132 is linked to suspension pin 128 by a pivot arm 135. Pivot arm 135 is freely rotatably mounted on the suspension pin 128 by a collar 140 having a through bore 141 which receives a bearing race 142 carrying a spherical bearing 143 and secured in place by retaining rings 144. A stop or spacer 145 secured by a set screw 146 positions pivot arm 135 on suspension pin 128 in a manner similar to spacer 45. An adjustable sleeve 148 is formed in the other end of pivot arm 135 and attached to the shaft 132 in a manner to be hereinafter described.

According to the present modified form of the invention, a friction disk, generally indicated by the numeral 150, is employed which is of different construction than the friction disk 50 described above. As shown, the friction disk 150 is located proximate to the end of roll 131 and has a slightly greater radial dimension at the outer contact surface 152 to make firm frictional contact when engaged by the conveyor belt 120. Friction disk 150 has spaced radial side walls 153 which cooperate with contact surface 152 to form an annular cavity about the shaft 132. For purposes of convenience in construction and maintenance, the side walls 153 and contact surface 152 may be formed in two parts and operatively joined by a machine screw 154 to constitute a housing 155.

Housed within the friction disk 150 is a planetary reduction gear system, generally indicated by the numeral 160. One or more gear shafts 161 extend through the side walls 153 of housing 155 near the radial extremities or spaced a short distance from the contact surface 152. The gear shaft 161 may be secured to prevent axial displacement by a head 162 on one extremity and a retaining ring 163 on the other, or comparable fastening elements. Each gear shaft 161 freely rotatably mounts a planet gear 165 having two sets of gear teeth 166 and 167 of differing pitch circle diameters. Mounted on shaft 132 is an internal sun gear 170 having gear teeth 170′ which matingly engages the gear teeth 167 of planet gear 165. Sun gear 170 has a curved shoulder 171 which seats balls 172 supporting a side wall 153 of housing 155 with minimum frictional resistance during relative rotation. Sun gear 170 has an elongated hub 173 which is nonrotatably attached to the shaft 132 by a suitable key 174. The elongated hub 173 of sun gear 170 is of sufficient length to extend into the adjustable sleeve 148 of pivot arm 135 where it is rotationally restrained by suitable keying, such as the Woodruff key 175.

The elongated hub 173 of sun gear 170 also freely rotatably mounts an external or radially outer sun gear 180 having gear teeth 180' which matingly engage the gear teeth 166 of planet gear 165. Sun gear 180 has a curved shoulder 181 which seats balls 182 supporting a side wall 153 of housing 155 with minimum frictional resistance during relative rotation. A relatively short axial hub 183 projects from gear 180 in one direction and is circumferentially engaged by an adjustable collar 184 of a reaction arm 185 and rotationally restricted by suitable keying such as the Woodruff key 186. The collar 184 has a U-shaped slot 187 (FIG. 9) to engage a pivot pin 188 which is secured to mounting plate 126 by fillet welds 189 and projects outwardly therefrom in a manner similar to the suspension pin 128. The U-shaped slot 187 allows the reaction arm 185 to rotate about and displace slightly radially of the pivot pin 188 to accomplish a purpose described below.

In operation, the mistracking or deviation of the belt 120 to the side of the roll 131 causes the belt to ride up on the friction disk 150, frictionally engage the contact surface 152 and rotate the housing 155 about the shaft 132. When housing 155 is rotated, the planet gear 165 rotates about the gear shaft 161 causing, through the sun gears 170 and 180, a change in angular relation between the pivot arm 135 and the reaction arm 185. This results in the pivot arm 135 pivoting or swinging about the suspension pin 128, thereby correctively displacing the roll 131 in the direction of belt travel in the manner previously described.

As viewed in FIG. 9, the pivot arms 135 are substantially vertically aligned when the roll 131 is in the normal position and the belt 120 is not engaging the friction disk 150. As the friction disk 150 is rotated by the belt 120, the pivot arms 135 of the adjacent tracking roller assemblies 130 are rotated in one direction while the reaction arms 185 are rotated in the opposite direction to displace the shafts 132. Despite the fact that the belt 120 rotates the adjacent rolls 131 and friction disks 150 in opposite directions due to their relative positions, the planetary reduction systems 160 must have the pitch circles of the planet gears 165 and sun gears 170 and 180 designed to give substantially equal displacements of the pivot arms 135, reaction arms 185, and shafts 132 in the same direction. The planetary reduction systems 160 at the other ends of tracking roller assemblies 130 (not shown) would be substantial equivalents, except directionally opposite displacements would require that each tracking roller assembly 130 have an opposite planetary reduction system 160 on the other end, like the adjacent system on the adjoining roll.

Although a single tracking roller assembly 130 will suffice, two assemblies positioned as shown in FIG. 9 are advantageous to insure adequate frictional contact between the rolls 131 and conveyor belt 120. Limiting apparatus to restrain the rotation of friction disk 150 may be provided to insure that the reaction arm 185 does not escape from the pivot pin 188. Stop pins 190 may be attached to the housing 155 of friction disk 150 to engage stop blocks 191 and 192 at the desired forward and rearward extremities of travel of the shaft 132. A rearward travel of each end of a tracking roller assembly 130 is necessary when the other end pivots forward to a corrective position. The gearing ratio in the planetary reduction gear system 160 must be designed so that the system will back up when the belt 120 tracks to the other side without serious resistance or binding. An overall gear reduction of approximately ten to one is an example of a gear ratio meeting the requirements of adequate mechanical advantage and sufficient backing freedom.

Figure 10:
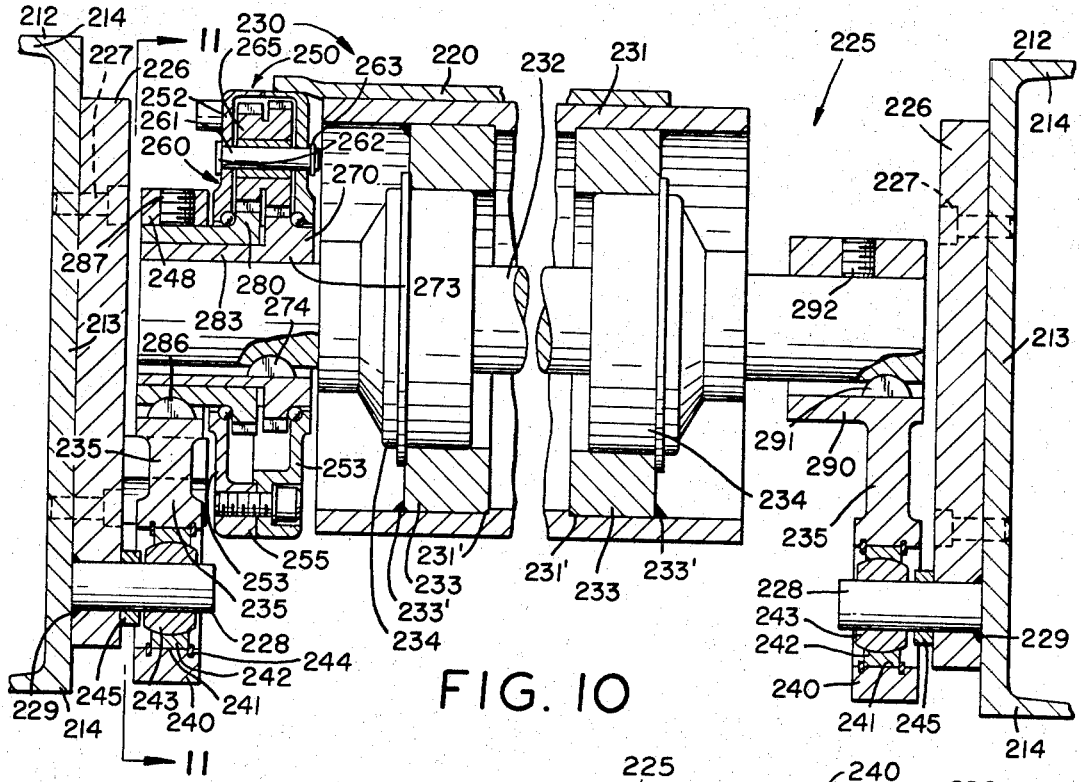
FIG. 10 is an enlarged fragmentary section view, similar to FIG. 7, showing an alternate attachment of the planetary gearing arrangement in the belt centering apparatus.
Figure 11:
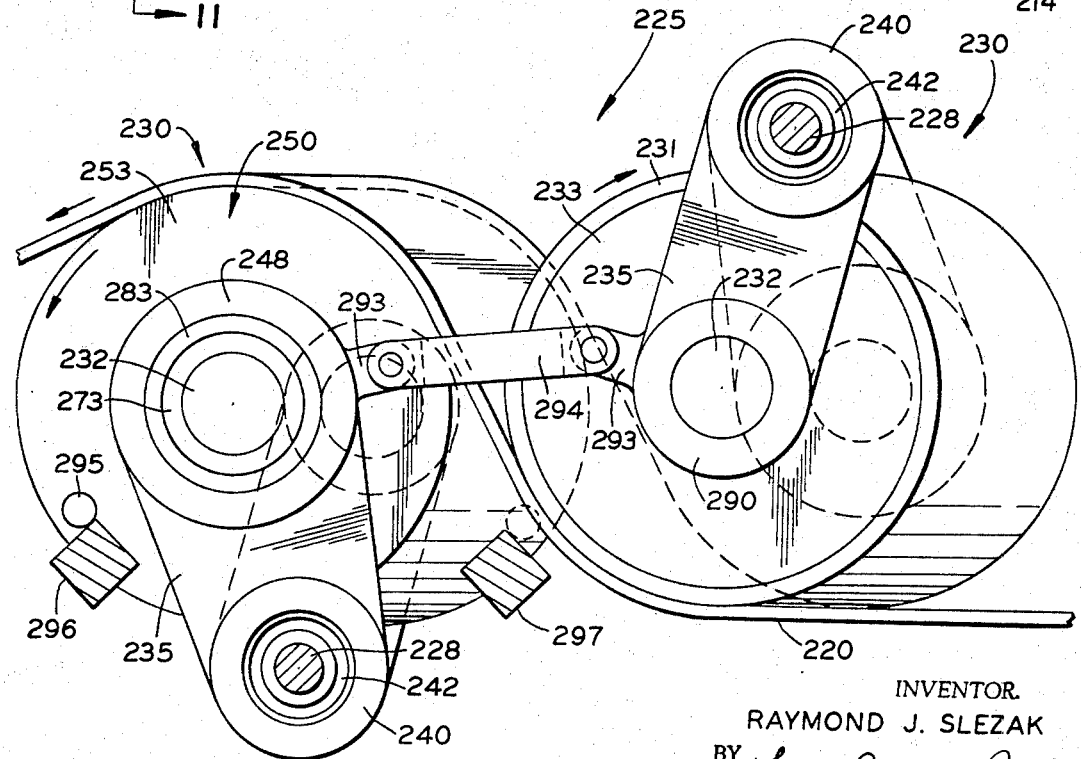
FIG. 11 is a section view, similar to FIG. 9, showing the ends of adjacent rollers of the alternate attachment of FIG. 10 displaced to a corrective position.

In applications where less sensitive reaction, reduced cost, or other design factors allow less stringent performance characteristics than that provided by tracking assembly 125, a modified planetary tracking system, generally indicated by the numeral 225 and shown in FIGS. 10 and 11, may be employed. Rather than using two planetary systems per tracking roller assembly, this construction contemplates the use of a single friction disk and enclosed planetary system for each roller assembly.

The tracking assembly 225 may be employed and is shown in the same general conveyor environment as tracking assemblies 25 and 125. The portion of a channel beam 212 having web 213 and spaced flanges 214 may be identical to the beams 12 and 112 of the previously described frame 11. The other components of the frame 11, terminal rollers 15, 16 and conveyor belt 20 appearing in FIGS. 1–6, or their equivalents, would also be present. Tracking assembly 225 may be attached to the frame in the same position and in an identical manner as the tracking assemblies 25 and 125 described above. Referring now to the entire tracking assembly shown in FIG. 10, mounting plates 226 are attached to the webs 213 of channel beam 212 by fasteners 227. A suspension pin 228 rigidly secured to the mounting plate 226 by fillet weld 229 projects outwardly therefrom and preferably substantially perpendicular thereto.

In the prior tracking assemblies 25 and 125, one or more tracking roller assemblies, 30 and 130, preferably two, constituted an operative combination; however, according to this construction at least two tracking roller assemblies 230 are necessitated. Each tracking roller assembly 230 has a roll 231 which seats a conveyor belt 220 on a portion of its periphery. The rolls 231 are freely rotatably mounted on a through shaft 232. Non-rotatably mounted within each end of rolls 231 are annular inserts 233 which are fixed longitudinally of rolls 231 by shoulders 231' and rotationally secured by fillet welds 233'. The inserts 233 nonrotatably seat bearing races 234 to serve as a collar for the shaft 232.

Axially outwardly of the ends of rolls 231, the shaft 232 is linked to suspension pins 228 by a pivot arm 235. Pivot arms 235 are freely rotatably mounted on the suspension pins 228 by collars 240 having through bores 241 which receive bearing races 242 carrying spherical bearings 243 and secured in place by retaining rings 244. Suitable clearance is provided between the collars 240 of pivot arms 235 and the adjacent mounting blocks 226 by means of annular spacers 245.

According to the present modified form of the invention, a friction disk 250 is employed at one end of each tracking roller assembly 230 which is similar to the friction disk 150, but operatively connected in a different manner. As shown, the friction disk 250 is located proximate to one end of roll 231 and has a slightly greater radial dimension at the outer contact surface 252 to make firm frictional contact when engaged by the conveyor belt 220. Friction disk 250 has spaced radial side walls 253 which cooperate with contact surface 252 to form a housing 255 defining an annular cavity about the shaft 232.

Housed within the friction disk 250 is a planetary reduction gear system, generally indicated by the numeral 260. One or more gear shafts 261 extend through side walls 253 of housing 255. The gear shafts 261 may be secured to prevent axial displacement by suitable retention elements, such as a head 262 on one extremity and a retaining ring 263 on the other. Each gear shaft 261 freely rotatably mounts a planet gear 265 having two sets of gear teeth of differing pitch circle diameters. Mounted on shaft 232 is an internal sun gear 270 which matingly engages one set of gear teeth of planet gear 265. Sun gear 270 may be provided with a suitable shoulder and balls to receive one side wall 253 of housing 255 with minimum frictional resistance. Sun gear 270 is provided with an elongated hub 273 which is nonrotatably attached to the shaft 232, as by a Woodruff key 274.

The elongated hub 273 of sun gear 270 also freely rotatably mounts an external or radially outer sun gear 280 which matingly engages the other set of gear teeth of planet gear 265. Sun gear 280 may be provided with a suitable shoulder and balls to receive one side wall 253 of housing 255 with minimum frictional resistance. A relatively short axial hub 283 projects from sun gear 280 and is circumferentially engaged by an annular sleeve 248 formed in the end of pivot arm 235 opposite the collar 240. Relative rotational motion between the collar 240 of pivot arm 235 and hub 283 of sun gear 280 is precluded by a Woodruff key 286, thereby constituting a departure from the operative attachment of tracking roller assemblies 130. Additionally, a second key or a set screw 287 may be employed to further insure the nonrotational rigidity of this joint.

Due to the modified attachment of friction disk 250 to shaft 232 and pivot arm 235, a friction disk 250 is not required at the opposite end of tracking roller assembly 230. Rather, as seen in the right hand portion of FIG. 10, the pivot arm 235 at that end is rigidly, nonrotatably attached to the shaft 232. This may be accomplished by a sleeve 290 encompassing the periphery of shaft 232 and suitable rotation and axial movement restraining elements in the form of a Woodruff key 291 and a set screw 292, respectively.

In operation, the mistracking or deviation of the belt 220 to the side of the roll 231 having the friction disk 250 causes the belt to ride up on the friction disk, frictionally engage the contact surface 252 and rotate the housing 255 about the shaft 232. When housing 255 is rotated, the planet gear 265 rotates about the gear shaft 261, causing, through the sun gears 270 and 280, a change in angular relation between the pivot arm 235 at the left end of roller assembly 230 in FIG. 10 and the pivot arm 235 at the right end of the same roller assembly. In effect, the shaft 232 is employed as a functional substitute for the reaction arm 184 of roller assembly 130. This angular change causes pivot arm 235 at one end of roller assembly 230 to swing in one direction while the pivot arm 235 at the other end swings in the opposite direction, thereby correctively displacing the roll 231 in the direction of belt travel. In contrast to the tracking roller assemblies 30 and 130, it should be noted that the pivot arms 235 at end of each roller assembly 230 project vertically in the same direction from the shaft 232. The pivot arms 235 at corresponding ends of adjacent roller assemblies 230 may project in the same or opposite directions.

As previously indicated, only one friction disk 250 is employed per tracking roller assembly 230; therefore, it is mandatory that two tracking roller assemblies 230 be used. As seen in FIG. 11, a friction disk 250 is located at the near end of the left hand roller assembly 230, while the friction disk for the right hand roller assembly 230 would be at the opposite end of this adjacent roll. Since the near end of the right hand roller assembly 230 has no friction disk 250, the corrective displacement must be prompted by the adjacent or left hand roller assembly 230. The collar 248 of the left hand pivot arm 235 and the collar 290 of right hand pivot arm 235 are provided with projecting swivel joints 293 which are loosely joined by a connecting link 294. Thus, a single friction disk 250 serves to sense and correct the corresponding end of the adjacent tracking roller assembly 230.

Limiting apparatus to restrain the rotation of friction disks 250 may be provided to prevent excessive displacement in a manner similar to that employed for tracking roller assemblies 130. Stop pins 295 may be attached to the housing 255 of each friction disk 250 to engage stop blocks 296 and 297 at the desired forward and rearward extremities of travel of the shaft 232. The comments above relating to the pitch circle diameters and other design criteria of the planetary reduction gear system 160 are equally applicable to the planetary system 260.

A preferred form of the invention and several alternative embodiments have been shown and described in sufficient detail to enable one skilled in the art to practice the invention. Since various modifications in details, material, and arrangements of parts are within the spirit of the invention herein disclosed and described, the scope of the invention should be limited solely by the scope of the attached claims.

What is claimed is:

1. A roller system tracking apparatus for a moving belt having a tracking roller assembly comprising, frame means, single shaft means, roll means freely rotatably mounted on said shaft means and engaging said moving belt, a pair of suspension pin means attached to said frame means, and a pivot arm means rotatably mounted on each said suspension pin means and supporting said shaft means, at least one pivot arm means being nonrotatably attached to said shaft means, whereby a mistracking of said moving belt to one side of said roll means causes opposed angular displacement of the pivot arm means correcting the lateral travel of said belt.

2. Apparatus according to claim 1, wherein said pivot arm means are normally disposed substantially perpendicular to the plane of travel of the incoming portion of said moving belt to said tracking roller assembly.

3. Apparatus according to claim 2, wherein said pivot arm means displace in a plane substantially perpendicular to the plane of travel of said moving belt and said roll means pivots in a plane substantially parallel to the plane of travel of said moving belt about a point substantially medially of the axial length thereof.

4. Apparatus according to claim 2, wherein one of said pivot arm means extends perpendicular in one direction from said shaft means and the other of said pivot arm means extends in the opposite direction, both of said pivot arm means being nonrotatably attached to said shaft means.

5. Apparatus according to claim 4 also comprising, friction disk means nonrotatably attached to said shaft means outwardly of said roll means, whereby a mistracking belt frictionally powers displacement of the adjacent pivot arm means.

6. Apparatus according to claim 5 wherein said friction disk means has an axial contact surface extending a distance radially beyond the periphery of said roll means to firmly frictionally engage said moving belt.

7. Apparatus according to claim 4 also comprising, friction disk means on said shaft means outwardly of said roll means and gear means associated with said friction disk means providing a mechanical advantage to the friction force developed between said friction disk means and said moving belt and tending to displace said pivot arm means.

8. Apparatus according to claim 7, wherein said gear means is a planetary reduction gear system.

9. Apparatus according to claim 8, wherein said planetary reduction gear system comprises, a planet gear operatively attached to said friction disk means and having two sets of gear teeth, a first sun gear meshing with one set of gear teeth of said planet gear and nonrotatably attached to said shaft means and said pivot arm means, a second sun gear meshing with the other set of gear teeth of said planet gear, a reaction arm nonrotatably attached to said second sun gear, and a pivot pin secured to said frame means and rotatably carrying said reaction arm, whereby a mistracking belt rotating said friction disk means produces a change in angular relation between said pivot arm means and said reaction arm.

10. Apparatus according to claim 9, wherein said first sun gear has an elongated hub engaging a sleeve on said pivot arm means, said second sun gear is freely rotatably mounted on said elongated hub of said first sun gear and has a hub engaging a collar on said reaction arm, and stop means restricting angular displacement of said disk means.

11. Apparatus according to claim 2, wherein said tracking apparatus comprises, at least two tracking roller assemblies having said pivot arm means of each tracking roller assembly extending in the same direction from said shaft means, one friction disk means on each tracking roller assembly, and connecting links joining adjacent pivot arm means of adjacent tracking roller assemblies, thereby providing displacement of adjacent pivot arm means.

12. Apparatus according to claim 11, wherein said friction disk means comprises, a planet gear mounted in said friction disk means and having two sets of gear teeth, a first sun gear meshing with one set of gear teeth of said planet gear and nonrotatably attached to said shaft means, a second sun gear meshing with the other set of gear teeth of said planet gear and nonrotatably attached to said pivot arm means, whereby a mistracking belt rotating said friction disk means produces a change in angular relation between the pivot arm means attached to said second sun gear and the second pivot arm means attached to said shaft means at the other end of said tracking roller assembly.

13. Apparatus according to claim 1, wherein said tracking apparatus comprises, at least two tracking roller assemblies providing frictional contact about a substantial portion of the peripheries of said roll means.

14. Apparatus according to claim 1, wherein said pivot arm means are displaced by exteriorly energized power means comprising, sensor means detecting mistracking of said moving belt and fluid drive means actuated by said sensor means and linked to said pivot arm means.

References Cited

UNITED STATES PATENTS

| | | | |
|---|---|---|---|
| 1,443,605 | 1/1923 | Yeaton | 74—240 |
| 2,199,893 | 5/1940 | Norton et al. | 74—241 |
| 2,431,856 | 12/1947 | Ziegler | 74—241 XR |
| 2,655,252 | 10/1953 | Spurgeon | 74—241 XR |
| 2,662,767 | 12/1953 | Dourdeville | 74—241 XR |
| 2,718,156 | 9/1955 | Wright | 74—241 |

FRED C. MATTERN, JR., *Primary Examiner.*

J. A. WONG, *Assistant Examiner.*